United States Patent
Tong

(10) Patent No.: US 8,710,166 B2
(45) Date of Patent: Apr. 29, 2014

(54) SHAPE MEMORY POLYMERS FORMED BY SELF-CROSSLINKING OF COPOLYMERS

(75) Inventor: Tat Hung Tong, Bellbrook, OH (US)

(73) Assignee: Cornerstone Research Group, Inc., Dayton, OH (US)

(*) Notice: Subject to any disclaimer, the term of this patent is extended or adjusted under 35 U.S.C. 154(b) by 384 days.

(21) Appl. No.: 12/995,009

(22) PCT Filed: May 28, 2009

(86) PCT No.: PCT/US2009/045398
§ 371 (c)(1),
(2), (4) Date: Nov. 29, 2010

(87) PCT Pub. No.: WO2009/146352
PCT Pub. Date: Dec. 3, 2009

(65) Prior Publication Data
US 2011/0282022 A1    Nov. 17, 2011

Related U.S. Application Data

(60) Provisional application No. 61/057,510, filed on May 30, 2008.

(51) Int. Cl.
*C08F 30/08* (2006.01)
*C08G 77/00* (2006.01)
*C08G 18/32* (2006.01)
*C08G 18/00* (2006.01)

(52) U.S. Cl.
USPC ............ 526/279; 528/10; 528/68; 528/85

(58) Field of Classification Search
USPC .......... 525/452, 451; 528/68, 85, 10; 526/279
See application file for complete search history.

(56) References Cited

U.S. PATENT DOCUMENTS

| | | | |
|---|---|---|---|
| 3,957,941 A * | 5/1976 | Kawaguchi | 264/234 |
| 5,145,935 A | 9/1992 | Hayashi | |
| 5,506,300 A | 4/1996 | Ward | |
| 5,665,822 A | 9/1997 | Bitler | |
| 6,720,402 B2 | 4/2004 | Langer | |
| 6,759,481 B2 | 7/2004 | Tong | |

OTHER PUBLICATIONS

Chen, Long-Term Stability of an ambient self-curable latex based on colloidal dispersion in water of two reactive polymer, 2005, Journal of Polymer Science: Part A: Polymer Chemistry, vol. 43, 2598-2605.*

Molenaar, Novel alkoxysilane Comonomers for 1-pack Post-crosslinkable latex systems, 2000, CIP-Data Library Technische Universiteit Eindhoven, 1-194.*

* cited by examiner

*Primary Examiner* — Monique Peets
(74) *Attorney, Agent, or Firm* — Dinsmore & Shohl LLP

(57) ABSTRACT

The present discovery shows how to make a self-crosslinking SMP. Shape Memory Polymer (SMP) can be formulated as a castable coating. This process allows the polymer to dissolve in solvent, and as the solvent evaporates the polymers self-crosslink at room temperature in air, creating a copolymer coating wherein the copolymer coating is an SMP. This technology has coating applications where shape memory would be an asset: from shape memory textile and fabric to self-healing coatings for vehicles and morphing skins for aircraft.

15 Claims, No Drawings

SHAPE MEMORY POLYMERS FORMED BY SELF-CROSSLINKING OF COPOLYMERS

CROSS-REFERENCE TO RELATED APPLICATION

Priority benefit of U.S. provisional application Ser. No. 61/057,510 filed May 30, 2008 is claimed.

BACKGROUND OF THE INVENTION

1. Field of the Invention

The present invention is directed to self-crosslinking shape memory polymers, their production and use. Particularly the current invention comprises a reaction product of a polymer with a self-crosslinking functional group which will self-crosslink under a given environmental stimulus. More particularly, the current invention comprises a reaction product of a small portion of silane crosslinker which is incorporated into the polymer chain by copolymerizing it with acrylates forming alkylsiloxyl groups in the acrylate copolymers.

Shape memory polymers (SMPs) are a unique class of polymers, which soften and harden quickly and repetitively on demand. This feature provides the ability to temporarily soften, change shape, and harden back to a solid structural state in various new highly detailed shapes and forms. Typical SMPs have a very narrow temperature span in which they transition between hard and soft states. This narrow glass transition temperature span is a key physical property that allows a SMP to maintain full structural rigidity up to a specifically designed activation temperature. Yet with as little as 5° C. to 10° C. increase above that temperature it quickly softens and allows shape change and subsequent re-hardening into new shapes.

2. Background of Prior Art

Shape memory materials are materials capable of distortion above their glass transition temperatures ($T_g$s), which store such distortion at temperatures below their $T_g$ as potential mechanical energy in the material, and release this energy when heated again to above the $T_g$, returning to their original "memory" shape. In essence, these materials can be "fixed" to a temporary shape under specific conditions of temperature and stress and later, under thermal, electrical, or other environmental command, the associated elastic deformation can be completely or substantially relaxed to the original, stress-free, condition.

SMAs

The first materials known to have these properties were shape memory metal alloys (SMAs), including TiNi (Nitinol), CuZnAl, and FeNiAl alloys. The shape-memory capabilities of the these metallic materials capable of exhibiting shape-memory characteristics occur as the result of the metallic alloy undergoing a reversible crystalline phase transformation from one crystalline state to another crystalline state with a change in temperature and/or external stress. With a temperature change of as little as about 10° C., these alloys can exert a stress as large as 415 MPa when applied against a resistance to changing its shape from its deformed state. Such alloys have been used for such applications as intelligent materials and biomedical devices. These materials have been proposed for various uses, including vascular stents, medical guide wires, orthodontic wires, vibration dampers, pipe couplings, electrical connectors, thermostats, actuators, eyeglass frames, and brassiere underwires. However, these materials have not yet been widely used, in large part because they are very expensive. Additionally, their applications have been limited due to limited ability to withstand strains greater than approximately 8%.

SMPs

Shape memory polymers (SMPs) are being developed to replace or augment the use of SMAs, in part because the polymers are lightweight, high in shape recovery ability, easy to manipulate, and economical as compared with SMAs. SMPs are materials capable of distortion above their glass transition temperature ($T_g$), storing such distortion at temperatures below their $T_g$ as potential mechanical energy, via elastic deformation, in the polymer, and release this energy when heated to temperatures above their $T_g$, returning to their original memory shape. When the polymer is heated to near its transition state it becomes soft and malleable and can be more easily deformed. When the temperature is decreased below its $T_g$, the deformed shape is fixed by the higher rigidity of the material at a lower temperature while, at the same time, the mechanical energy expended on the material during deformation will be stored. Thus, favorable properties for SMPs will closely link to the network architecture and to the sharpness of the transition separating the rigid and rubbery states.

Polymers intrinsically show shape memory effects on the basis of rubber elasticity, but with varied characteristics of temporary shape fixing, strain recovery rate, work capability during recovery, and retracted state stability. The first shape memory polymer (SMP) reported as such was cross-linked polyethylene; however, the mechanism of strain recovery for this material was immediately found to be far different from that of the shape memory alloys. When the polymer is heated to a soft, pliable state, it can be deformed under resistance of ~1 MPa modulus. When the temperature is decreased below the glass transition temperature ($T_g$), the deformed shape is fixed by the higher rigidity of the material at lower temperature while, at the same time, the mechanical energy expended on the material during deformation will be stored. When the temperature is raised above the $T_g$, the polymer will recover to its original form as driven by the restoration of network chain conformation entropy. Thus favorable properties for SMPs will be closely linked to the network architecture and to the sharpness of the transition separating the rigid and rubber states. Compared with SMAs, SMPs can withstand high strains, typically at least 100% 400%, while the maximum strain of the SMA is typically less than 8%. As an additional advantage, due to the versatility of polymers, the properties of SMP can be tailored according to the application requirements, a factor that is very important in industry.

Several physical properties of SMPs other than the ability to memorize shape are significantly altered in response to external changes in temperature and stress. These properties include the elastic modulus, hardness, flexibility, vapor permeability, damping, index of refraction, and dielectric constant. The elastic modulus (the ratio of the stress in a body to the corresponding strain) of an SMP can change by a factor of up to 200 when heated above its melting point or glass transition temperature. Also, the hardness of the material changes dramatically when it is at or above its melting point or glass transition temperature. When the material is heated to a temperature above the melting point or glass transition temperature, the damping ability can be up to five times higher than a conventional rubber product. The material can readily recover to its original molded shape following numerous thermal cycles.

Heretofore, numerous polymers have been found to have particularly attractive shape memory effects, most notably acrylates, polyurethanes, polynorbornene, styrene-butadiene copolymers, and cross-linked polyethylene.

In the literature, polyurethane-type SMPs have generally been characterized as phase segregated linear block copolymers having a hard segment and a soft segment. The hard segment is typically crystalline, with a defined melting point, and the soft segment is typically amorphous, with a defined glass transition temperature. In some embodiments, however, the hard segment is amorphous and has a glass transition temperature rather than a melting point. In other embodiments, the soft segment is crystalline and has a melting point rather than a glass transition temperature. The melting point or glass transition temperature of the soft segment is substantially less than the melting point or glass transition of the hard segment.

Examples of polymers used to prepare hard and soft segments of known SMPs include various polyethers, polyacrylates, polyamides, polysiloxanes, polyurethanes, polyether amides, polyurethane/ureas, polyether esters, and urethane/butadiene copolymers. See, for example, U.S. Pat. No. 5,506,300 to Ward et al.; U.S. Pat. No. 5,145,935 to Hayashi; U.S. Pat. No. 5,665,822 to Bider et al.; and U.S. Pat. No. 6,720,420 to Langer et al.

Conventional SMPs generally are segmented polyurethanes and have hard segments that include aromatic moieties. U.S. Pat. No. 5,145,935 to Hayashi, for example, discloses a shape memory polyurethane elastomer molded article formed from a polyurethane elastomer polymerized from of a difunctional diisocyanate, a difunctional polyol, and a difunctional chain extender.

Recently, however, SMPs have been created using reactions of different polymers to eliminate the need for a hard and soft segment, creating instead, a single continuous piece of SMP. U.S. Pat. No. 6,759,481 to Tong, discloses such a SMP using a reaction of styrene, a vinyl compound, a multi-functional cross-linking agent and an initiator to create a styrene based SMP.

Waterborne Polymers

Waterborne polymer dispersions are rapidly becoming the coating of choice for an increasing number of industrial and applications, thanks to their being environmentally, healthy and relatively safe. Indeed, over the last 20 years a rapid improvement of both performance and production costs has been prompted by a better understanding of the chemistry and mechanisms of film formation and development of main microscopic properties relevant to coating applications, such as adhesion, cohesion, curing mechanisms, surface properties, surface dynamics, and stability against aging.

However, while the technology gap between conventional solvent-based and waterborne coating formulations has progressively narrowed, some issues related to mechanism and physics of the film formation and to the role of the various components in providing a given coating performance are still challenging and require further research.

Among the features to be considered as a selection of functional groups or additives inducing the cross-linking in a latex polymer, the nature of the chemical reaction involved and schematics are crucial. In fact, untimely cross-linking during polymerization or in the latex dispersion can negatively affect both colloidal stability, causing coagulation, and film formation, hampering the last stage of inter-particle polymer diffusion.

Despite the many excellent properties of siloxanes, the poor compatibility between poly-siloxane and acrylics (or acrylic styrene) brings disadvantages to their polymerization and products, so trialkoxysilane has often been used as a cross-linking agent to form a middle transition later between the core and show to improve the compatibility between poly-siloxane and poly acrylics. Much research on the cross-linking poly-siloxane products and on improving product properties have been reported; however, reports about the self cross-linking properties of organo-silicone acrylic emulsions with vinyl trialkoxysilane have seldom been seen. One report states that latex particles incorporate these chemicals to give them self cross-linking properties in the film forming process. However, this report shows that the film is cast and then cross-linking occurs additionally only between latex to latex particles but not spontaneously within the polymer composition. Therefore there is still a need in the industry for a film that is cross-linked during casting instead of after and which cross-links across the entire mixture not just one portion to another.

SUMMARY OF THE INVENTION

The present discovery shows how to make a self-crosslinking SMP. Shape Memory Polymer (SMP) can be formulated as a castable coating. This process allows the polymer to dissolve in solvent, and as the solvent evaporates the polymers self-crosslinks at room temperature in air, creating a copolymer coating wherein the copolymer coating is an SMP. This technology has coating applications where shape memory would be an asset: shape memory fabric and textile to self-healing coatings for vehicles and morphing skins for aircraft.

DETAILED DESCRIPTION OF THE INVENTION

Shape memory polymer (SMP) can provide both elastic force and shape recovery capabilities with the potential to generate a new type of SMP technology. Though SMP coatings on a substrate help to prevent damage and assist in the repair of a substrate, the technology has not previously been optimized to replace technologies currently available. New SMP coatings and processes demonstrating increased performance benefits that are equal to or exceed that of current durable press treatments are presented herein.

There are two approaches involving wet chemistry to allow the preparation of polymers that will form an SMP film on fabric, via solution casting. One approach is a two-step process to form an ambient self cross-linking system based on siloxane-acrylate polymers. The first step incorporates a small molecule siloxane monomer (such as vinyl triethoxylsilane) into the polymer chain by copolymerizing it with acrylates during polymerization. Unlike other chemically crosslinked SMPs, no significant cross-linking happens in this step, and the polymer will remain soluble in a solvent i.e. no gelation of the polymer happens. The acrylate chain will be long and weigh at least 1000 MW. In the second step water causes the alkoxy groups of the siloxane to hydrolyze into silanol groups, for example via acid-base catalysts which allow the network to be formed by poly condensation.

The siloxane containing acrylates will be polymerized before the application to the substrate to impart shape memory. Also the Si—O—C bond is much easier to hydrolyze and condense both in acidic and alkaline media, so controlling the pH can also prevent the silane from hydrolyzing during backbone polymerization and storage.

It is possible to tailor the degree of cross-linking by changing the composition of the siloxane group and the number of siloxane groups on each polymer chain. These polymers will self cross-link at room temperatures as the polymer coating is applied to the fabric if there is enough water in the environment. The room temperature cross-linking process would avoid or reduce the use of organic solvents and provide an out-of-hood coating process for transition to product development.

The process to form a self cross-linking system: A small portion of silane cross-linker is incorporated into the polymer chain by copolymerizing it with acrylates forming alkylsiloxyl groups in the acrylate copolymers; the copolymer is dissolved in a solvent to form a polymer solution. These polymers will self-crosslink at room temperatures as the polymer solution is applied to the substrate. The alkylsiloxyl groups are converted into silanol groups, via hydrolysis. The hydrolysis allows the formation of network structure by polycondensation to achieve shape memory effect. To speed up self-crosslinking, film can be exposed to steam to aid hydrolysis.

A first monomer must be mixed with a second monomer, or also referred herein to as a co-monomer that is capable of initiating the self-crosslinking feature under certain stimuli in the presence of an initiator.

The first monomer may be selected from among the following: vinyl neodecanoate, vinyl benzoate, vinyl propionate, vinyl stearate, a methylstyrene, which may be a mixture, styrene, 3-methylstyrene or 4-methylstyrene, a vinyl pyridine, which may be a mixture, 2-vinyl pyridine, 3-vinyl pyridine or 4-vinyl pyridine, vinyl laurate, vinyl butyrate, vinyl acetate, vinyl stearate, vinyl 2-furate, vinyl phenylacetate, vinyl carbazole, 4-vinylbenzyl acetate, 4-vinylbenzoic acid, vinyl methyl sulfone, vinyl octadecyl ether, vinyl isooctyl ether, N-vinyl-2-pyrrolidone, N-vinyl-N-methylacetamide, 1-vinylimidazole, N-vinylformamide, N-vinylcaprolactam, vinyl azolactone, N-vinylurea, 4-(vinyloxy)butyl stearate, 4-(vinyloxy)butyl benzoate, 4-(vinyloxymethyl)cyclohexyl-methyl benzoate, methyl acrylate, methyl methacrylate, butyl acrylate, t-butyl acrylate, butyl methacrylate, t-butyl methacrylate, hexyl acrylate, acrylic acid, methacrylic acid, benzyl acrylate, benzyl methacrylate, 2-n-butoxyethyl methacrylate, 2-cyanoethyl acrylate, cyclohexyl acrylate, cyclohexyl methacrylate, decyl acrylate, dicyclopentenyl acrylate, dicyclopentenyloxyethyl acrylate, dicyclopentenyloxyethyl methacrylate, dodecyl acrylate, dodecyl methacrylate, 2-ethoxyethyl methacrylate, 2-ethylhexyl acrylate, ethyl methacrylate, 2-hydroxyethyl acrylate, 2-hydroxyethyl methacrylate, isobornyl acrylate, isobornyl methacrylate, 2-(2-methoxyethoxy)ethyl acrylate, 2-(2-methoxyethoxyl) ethyl methacrylate, 2-methoxyethyl acrylate, 2-methoxyethyl methacrylate, 2-methoxypropyl acrylate, 2-methoxypropyl methacrylate, octyl methacrylate, 2-phenoxyethyl acrylate, 2-phenoxyethyl methacrylate, phenyl acrylate, 2-phenylethyl acrylate, 2-phenylethyl methacrylate, phenyl methacrylate, propyl acrylate, propyl methacrylate, stearyl acrylate, stearyl methacrylate, 2,4,6-tribromophenyl acrylate, undecyl acrylate or undecyl methacrylate, 2-(acryloyloxy)acetoacetate, 2-(methacryloyloxy)acetoacetate, 2-(3,4-epoxy cyclohexy)ethyltriethoxysilane; 2-(3,4-epoxy cyclohexy)ethyltrimethoxsilane; (3-glycidoxpropyl)methyl diethoxysilane; (3-glycidoxpropyl)methyl dimethoxysilane; 3-glycidoxpropyl)trimethyl silane; 5,6-epoxyhexyl triethoxysilane.

Co-monomers which can be used to initiate the self-crosslinking upon exposure to water are: (3-Acryloxypropyl) trimethoxysilane; (3-Acryloxypropyl)methyldimethoxysilane; 3-(N-Allylamino)propyltrimethoxysilane; Allyltrimethoxysilane; Docosenyltriethoxysilane; Dodecyltriethoxysilane; o-(methacryloxyethyl)-N-triethoxysilypropyl)urethane; methacryloxymethyltriethoxysilane; methacryloxymethyltrimethoxysilane; methacryloxypropyltrimethoxysilane; Vinyltriethoxysilane; and vinyltrimethoxysilane.

A second approach is an ambient temperature self cross-linking system based on the Menschutkin reaction (quaternatrization) of halides with tertiary amines. Halide functionalized acrylates with amine functionalized acrylates are produced via separate emulsion polymerizations. When the halide and amine functionalized acrylates are mixed in a water dispersion and cast they form elastic films by cross-linking. These cross-links are stable up to 215° C. and since the washer/dryer cycle operates at temperatures well below 200° C. the SMP film will maintain its shape recovery properties throughout the washer/dryer cycle. This Menschutkin reaction is expected to be suitable for SMP coatings because it does not require a catalyst or organic solvents, occurs at room temperature and both functional groups are stable in aqueous media.

The first monomers which can be used to initiate the self-crosslinking upon exposure to thermal energy are: Chloromethylstyrene (vinylbenzyl chloride), vinyl chloride, 3-chloro-2-methyl-1-propene. Co-monomers which can be used to initiate the self-crosslinking upon exposure to thermal energy are: 2-(dimethylamino)ethylacrylate, 2-(dimethylamino) ethyl methacrylate, 2-vinyl pyridine, 3-vinyl pyridine, 4-vinylpyridine, acrylamide, acrylomorpholine, methacrylamide, and vinyl imidazole.

While there are some chemicals that can be both the first monomer and the co-monomer, no single chemical can be the first monomer and co-monomer in one single formulation. For example, 4-vinyl pyridine may be the first monomer or may be used as the co-monomer which will self-crosslink when exposed to heat, however, if 4-vinyl pyridine, is used as either the first monomer or the co-monomer, it then cannot be used as both.

The initiator of the reaction mixture may be a free radical or an ionic initiator. Free radical initiators within the scope of the present invention include organic peroxides, azo compounds and water soluble oxidizers. Commercially available organic peroxides may be utilized, tert-butyl peroxide, tert-butyl hydroperoxide, benzoyl peroxide, dicumyl peroxide and lauroyl peroxide are particularly preferred. Similarly, although any commercially available azo initiating compounds may be utilized, 2,2'-azobisisobutyronitrile is particularly preferred. Water soluble oxidizers that may be employed are potassium persulfate, ammonium persulfate. The ionic initiators are preferably cationic initiators. Preferred cationic initiators include boron trifluoride, boron trifluoride diethyl etherate, aluminum trichloride and tin (IV) chloride.

Several SMP formulations with each pathway mentioned above can be used and should focus on obtaining low glass transition temperature ($T_g$) SMPs for greatest usefulness of the SMP films. The preferred ranges for these temperatures are 10° C. to 60° C.

Film forming, curing and coating processes for each of the chemical approaches can be used to create a shape memory textile and fabric substrate. For self cross-linking SMPs where the final chemical cross-linking will occur on the fabric, elastic film formation is best.

There are significant differences between the prior art and the presently disclosed composition. The presently disclosed chemicals chemically cross-link as a neat resin. The presently disclosed chemicals cross-link as a castable film. The presently disclosed chemicals are a more homogeneous mixture where everything cross-links with each other. The prior art has a relatively high degree of cross-linking and is not an SMP or self-crosslinking, whereas the presently disclosed chemical is only 2-20% crosslinking density with a preferred crosslinking density of 5-15% and is a self-crosslinking SMP. The presently disclosed polymers have shape memory properties. The presently disclosed chemicals do not need to be made in one step and can be applied as a solution.

Shape Memory Polymer (SMP) can be formulated as a castable coating. This process allows the polymer to dissolve in solvent, and as the solvent evaporates the polymer self-crosslinks at room temperature in air, creating an SMP coating. The water-based, room temperature cross-linking process avoids or reduces the use of organic solvents and provides an out-of-hood coating process.

This technology has coating applications where shape memory would be an asset: shape memory textile and fabric to self-healing coatings for vehicles and morphing skins for aircraft.

It is possible to tailor the degree of cross-linking by changing the ratio of the silane cross-linker on the polymer backbone, while the other desirable thermomechanical properties, such as elongation and $T_g$ (glass transition temperature), can be fine tuned by the choice of acrylate co-monomers.

In one sample a 50/50 weight ratio of butyl methacryalte to methyl methacrylate, with 0.5% initiator and 2.5% cross-linker (by weight) was made. In a second sample butyl methacrylate, with 2% initiator and 2.5% cross-linker was made. In a third sample a 50/50 weight ratio of butyl methacryalte to hexyl methacrylate, with 2% initiator and 2.5% (by weight) was made.

Each solution was made from 10 g of polymer in 190 g of THF (making a 5% solution by weight). Each solution was cast as thin films from the 5% solutions by measuring out 12 g solution into Teflon petrie dishes and letting the THF evaporate in the fume hood. Three films were from each sample solution, 12 films total. The film from sample A seemed to form on the top of solution, forming a thin layer on top, while the films for samples B and C formed at the bottom.

The invention has been described above in conjunction with various exemplary embodiments of practicing the invention. It will be apparent to those skilled in the art that modifications can be made to those specifically disclosed embodiments without departing from the invention herein disclosed and described; the scope of the invention being limited only by the scope of the attached claims.

What is claimed is:

1. A self-crosslinking shape memory polymer comprising: a siloxane-acrylate polymer chain having a molecular weight of at least about 1000, the siloxane-acrylate polymer chain comprising at least one self-crosslinking functional group which will chemically self-crosslink when exposed to a self-crosslinking stimuli creating a chemically self-crosslinking shape memory polymer, wherein said self-crosslinking shape memory polymer obtains a cross-linking density of at least 2% and no more than 20%.

2. The self-crosslinking shape memory polymer of claim 1, wherein said self-crosslinking functional group is an alkylsiloxy functional group.

3. The self-crosslinking shape memory polymer of claim 2, wherein said chemical self-crosslinking occurs by polycondensation.

4. The self-crosslinking shape memory polymer of claim 2, wherein said self-crosslinking stimuli has a water content in air greater than 3 grams per one kilogram of air.

5. The self-crosslinking shape memory polymer of claim 2, wherein said self-crosslinking stimuli has a water content in air greater than 5 grams per one kilogram of air.

6. The self-crosslinking shape memory polymer of claim 2, wherein said self-crosslinking stimuli has a water content in air greater than 10 grams per one kilogram of air.

7. The self-crosslinking shape memory polymer of claim 1, wherein said self-crosslinking functional groups are an amine and a chlorine or halogen substitute.

8. The self-crosslinking shape memory polymer of claim 7, wherein said chemical self-crosslinking occurs by the Menschutkin reaction.

9. The self-crosslinking shape memory polymer of claim 7, wherein said self-crosslinking stimuli is a temperature of at least 20° C.

10. The self-crosslinking shape memory polymer of claim 1, wherein said self-crosslinking shape memory polymer obtains a cross-linking density of at least 5% and no more than 15%.

11. A self-crosslinking shape memory polymer comprising: a siloxane-acrylate polymer chain having a molecular weight of at least about 1000, the siloxane-acrylate polymer chain comprising at least one self-crosslinking functional group which will chemically self-crosslink when exposed to a self-crosslinking stimuli creating a chemically self-crosslinking shape memory polymer,
wherein said self-crosslinking functional group is an alkylsiloxy functional group, and
wherein said self-crosslinking stimuli has a water content in air greater than 3 grams per one kilogram of air.

12. The self-crosslinking shape memory polymer of claim 11, wherein said chemical self-crosslinking occurs by polycondensation.

13. The self-crosslinking shape memory polymer of claim 11, wherein said self-crosslinking stimuli has a water content in air greater than 5 grams per one kilogram of air.

14. The self-crosslinking shape memory polymer of claim 11, wherein said self-crosslinking stimuli has a water content in air greater than 10 grams per one kilogram of air.

15. The self-crosslinking shape memory polymer of claim 11, wherein said self-crosslinking shape memory polymer obtains a cross-linking density of at least 5% and no more than 15%.

* * * * *